United States Patent [19]

Johnson et al.

[11] 4,331,358
[45] May 25, 1982

[54] MOTORCYCLE FAIRING BODY EXTENDER

[75] Inventors: Randall K. Johnson, Morro Bay; Kenneth W. Cummings, San Luis Obispo; Charles M. Perethian, Santa Margarita, all of Calif.

[73] Assignee: First Champaign Corporation, Rantoul, Ill.

[21] Appl. No.: 157,333

[22] Filed: Jun. 9, 1980

[51] Int. Cl.³ .............................................. B62J 17/00
[52] U.S. Cl. ................................ 296/78.1; 280/289 S
[58] Field of Search ........................... 296/78.1, 97 G; 280/289 S, 289 G

[56] References Cited

U.S. PATENT DOCUMENTS

| | | | |
|---|---|---|---|
| 4,087,110 | 5/1978 | Vetter | 296/78.1 |
| 4,089,556 | 5/1978 | Stobar | 296/78.1 |
| 4,167,287 | 9/1979 | Franklin | 296/97 G |
| 4,178,033 | 12/1979 | Muth | 296/78.1 |
| 4,198,093 | 4/1980 | Muth | 296/78.1 |
| 4,226,463 | 10/1980 | Gager | 296/78.1 |

FOREIGN PATENT DOCUMENTS

| | | | |
|---|---|---|---|
| 18811 | 8/1897 | Austria | 296/78.1 |
| 206324 | 11/1923 | United Kingdom | 296/78.1 |

Primary Examiner—Joseph F. Peters, Jr.
Assistant Examiner—John A. Carroll
Attorney, Agent, or Firm—Wegner, McCord, Wood & Dalton

[57] ABSTRACT

A motorcycle fairing is mounted on a motorcycle in front of the rider position. The fairing body has lateral edges in front of and laterally spaced from the rider. Extenders are removably secured to the edges of the fairing body to provide additional rider protection. The extenders have an inner edge which mates with the lateral edges of the fairing body and a surface which blends with the fairing body surface.

11 Claims, 6 Drawing Figures

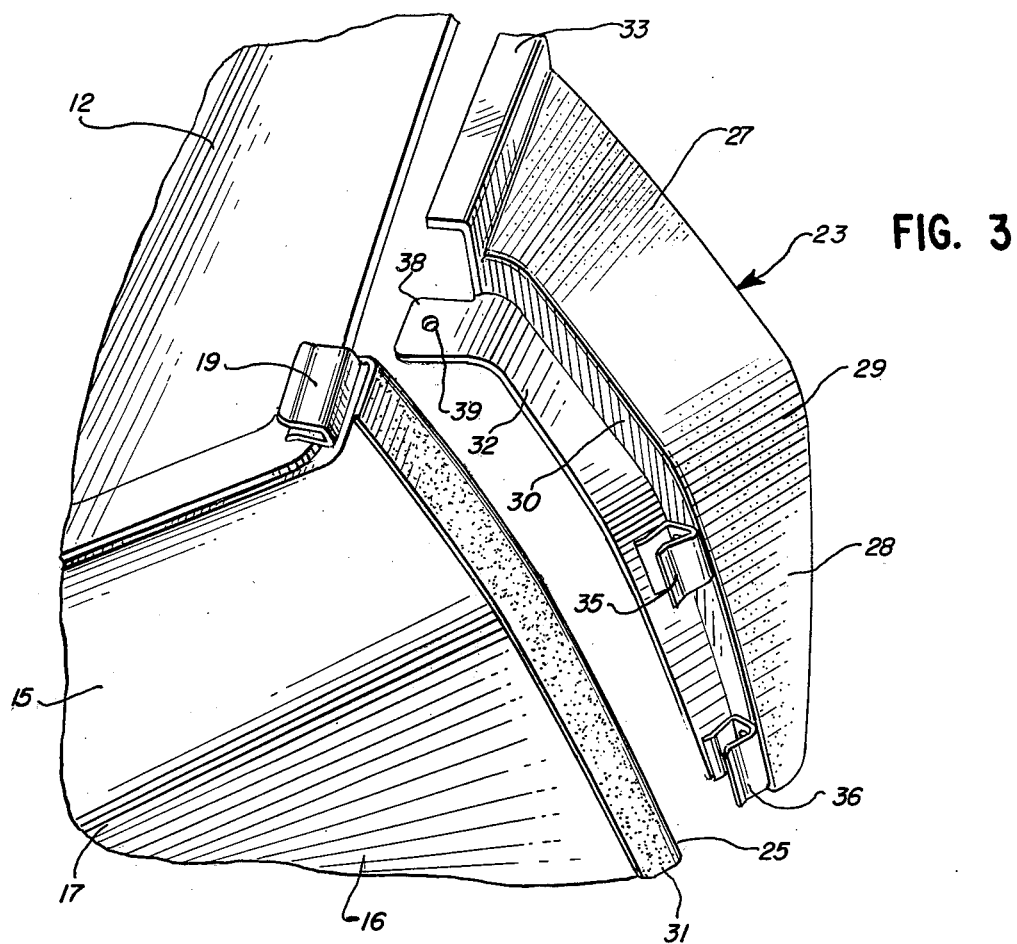

MOTORCYCLE FAIRING BODY EXTENDER

This invention relates to a lateral extender for the body of a motorcycle fairing.

Motorcycle fairings are available in various styles for different purposes. A touring fairing, desirable for long trips, is typically larger and heavier than a sport fairing designed for short trips. The smaller sport fairing does not provide the rider protection desirable for high speeds and long trips. However, where a motorcycle is used primarily for short trips and only occasionally for a long trip, a rider may not wish to contend with the bulk and weight or to pay the higher price of a touring fairing.

In accordance with the invention, fairing extenders are provided which increase the lateral width of the fairing body providing additional protection for the rider. They may be used with a sports fairing to provide the protection of a touring fairing or with a touring fairing to provide even greater protection, should that be desirable. The extenders are easily mounted on or removed from the fairing so that they may be used only when needed.

One feature of the invention is that the fairing extender is a panel with surfaces which blend with the surfaces of the fairing.

Another feature is that the edge of the extender mates with the lateral edge of the fairing body.

A further feature is that the extender is secured to the fairing for easy attachment and removal. More particularly, a spring clip on the extender fits over the lateral edge of the fairing. In addition, the extender has a tab underlying the fairing body through which a bolt extends, securing the extender to the fairing.

Further features and advantages of the invention will readily be apparent from the following specification and from the drawings, in which:

FIG. 3 is an enlarged fragmentary exploded view showing the extender in perspective and separated from the fairing;

FIG. 4 is an enlarged fragmentary section taken along line 4—4 of FIG. 1;

FIG. 5 is an enlarged fragmentary section taken along line 5—5 of FIG. 1; and

FIG. 6 is an enlarged fragmentary section taken along line 6—6 of FIG. 1.

The extenders are illustrated herein in combination with the fairing which is the subject of Vetter et al design application Ser. No. 89,913, filed Nov. 31, 1979, and assigned to the assignee of this application. Extenders could, of course, be used with other styles and models of motorcycle fairing.

Figure 1:
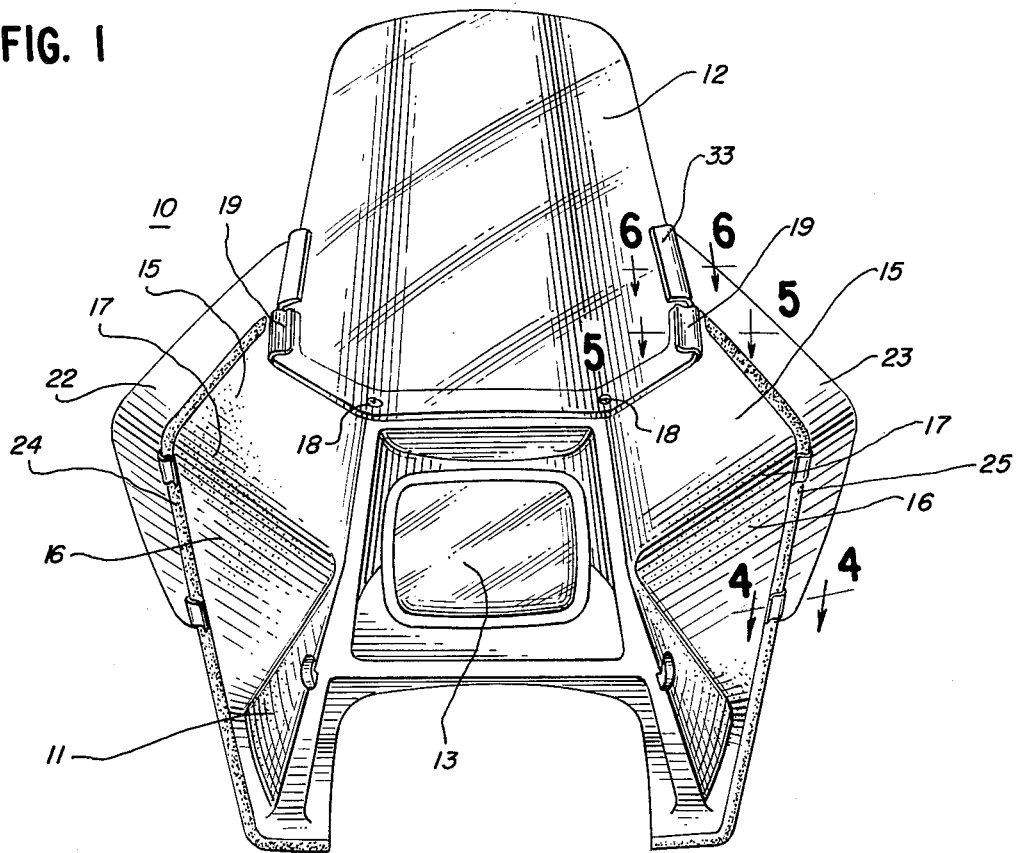
FIG. 1 is a front elevation of a fairing with extenders secured to each side.
Figure 2:
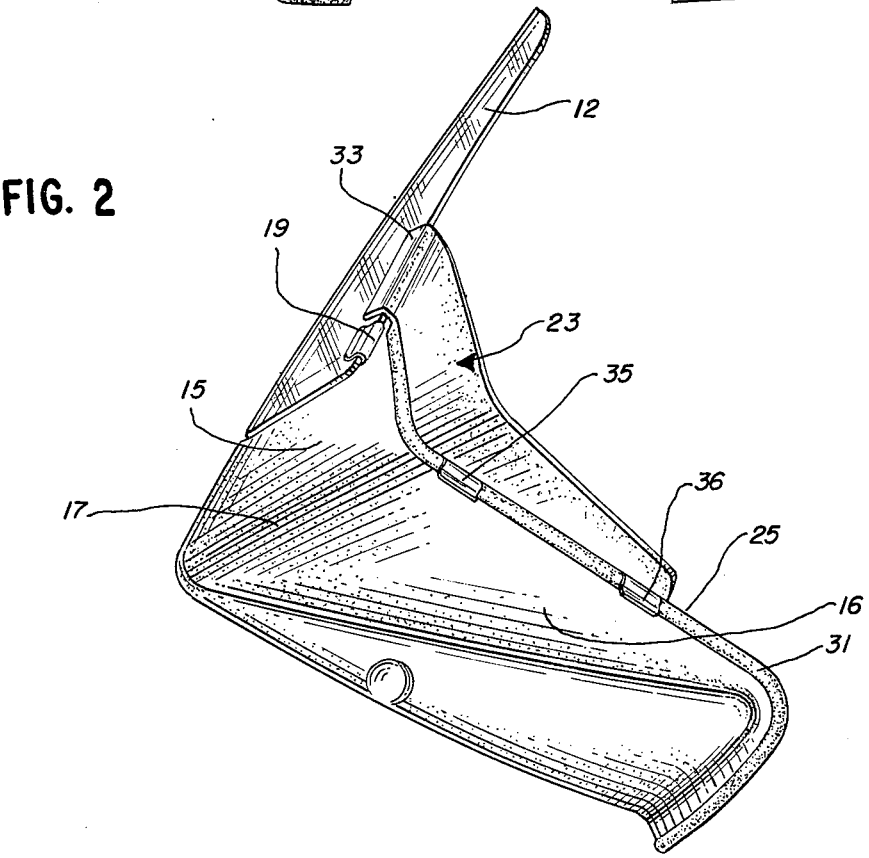
FIG. 2 is an elevation of the left side of the fairing and extender, looking from the right in FIG. 1.

With particular reference to FIGS. 1 and 2, the fairing 10 has a body 11 and a windshield 12. Mounted on the body is a headlight 13. The fairing is mounted on a motorcycle frame, as shown for example in Shumard et al application Ser. No. 118,528 filed Feb. 4, 1980, and assigned to the assignee of this invention.

Fairing body 11 has upper and lower lateral surfaces 15, 16, which are generally planar, and are joined along a radius 17. Windshield 12 extends upwardly from the upper portion of the fairing body and is secured thereto by bolts 18 and spring clips 19 as more particularly shown in Vetter U.S. Pat. No. 4,087,110 and Perethian application Ser. No. 113,755 filed Jan. 1, 1980, and assigned to the assignee of this application.

The fairing as mounted on a motorcycle is located in front of the rider and extends laterally and rearwardly partially enclosing the handlebars and the rider. As pointed out above, the model of fairing showing in the drawings is not as wide as a touring fairing of the type shown, for example, in Vetter U.S. Pat. No. Des. 252,624. In accordance with the invention, fairing body extenders 22, 23 are removably secured to the lateral edges 24, 25 of the fairing body 11. The extenders mate with the edges of the fairing and blend with the fairing surfaces. They have a vertical extent from the lower edge of windshield 12 down to an intermediate point on lower body surface 16. The extenders increase the width of the fairing body and provide additional protection for the rider. This is particularly desirable for long trips or inclement weather.

The extenders may be molded from a suitable thermoplastic material. The preferred material is a thermoplastic elastomer such as that sold by Uniroyal under the designation TPR. ABS plastics are also satisfactory.

Extenders 22, 23 have a complementary, mirror image configuration to mate with the two sides of the fairing. The left extender 23 is shown in FIGS. 3–6 and will be described in detail.

Extender 23 is a panel of sheet material having an upper surface 27 and lower surface 28 joined at an intermediate radius 29. The extender surfaces and radius blend with surfaces 15, 16 and radius 17 of the fairing body. A wall 30 extends inwardly from surfaces 27, 28 along the forward edge of the extender and mates with the lateral edge 25 of the fairing body which is finished with a trimstrip 31. Flange 32 extends forwardly from the inner edge of wall 30 and underlies the edge of the fairing body. The joint formed by wall 30 and the flange 32 with the edge of the fairing minimizes air leakage between the fairing and extender. A flap 33 is in a plane generally parallel to but offset from the plane of extender surface 27 to overlie windshield 12.

The extender 23 is secured to the fairing so that it can readily be installed and removed. A pair of spring clips 35, 36 are riveted to the wall 30 adjacent lower extender surface 28 and snap over the trimstrip 31 on the edge of the fairing. Upper spring clip 35 is positioned as close to radius 29 as practical while lower spring clip 36 is at the bottom of the extender panel. A tab 38 formed from flange 32 has a hole 39 to fit over the stud 40 of windshield mounting clip 19. Nut 41 holds the extender and the clip to the fairing body. A foam strip 42 seals the joint between the windshield and the fairing body. The spacing between tab 38 and flap 33 is such that the flap is held tightly against the windshield surface. Preferably the flap has an angled configuration as best seen in FIG. 6 so that the edge 33a is held tightly against the windshield minimizing chatter of the extender.

The extender is installed by removing nut 41 from the windshield clip stud, slipping the extender into place with the tab 38 over the stud and spring clips 35, 36 over the edge of the fairing. Nut 41 is replaced and the installation is complete. The extender is removed by reversing this procedure.

We claim:

1. A lateral extender to be mounted on a motorcycle fairing which has a fairing body carried on a motorcycle in front of the rider with a windshield extending upwardly from the top of the fairing body, the fairing body having lateral edges which are spaced at either side of the motorcycle rider, said lateral extender comprising:
- a panel having an inwardly directed edge which mates with the lateral edge of the fairing and a surface which blends with the fairing surface, the extender increasing the lateral dimension of the fairing and the protection of the rider; and
- means for securing the lateral extender to the fairing body.

2. A pair of extenders as defined in claim 1 for a motorcycle fairing, one mating with each of the lateral edges of the fairing body.

3. The fairing extender of claim 1 for attachment to a fairing body having angularly related lateral surfaces joined by a radius, said extenders having similar angularly related surfaces joined by a radius that blend with the fairing surfaces.

4. The fairing extender of claim 1 in which the inner edge of the fairing panel that mates with the lateral edge has a flange which underlies the fairing edge.

5. The fairing extender of claim 1 having a fixed flap which overlies the windshield.

6. The fairing extender of claim 1 in which the securing means includes a tab on the extender panel underlying the fairing, with a bolt extending from the fairing through the tab and a nut on the bolt securing the fairing and extender together.

7. The fairing extender of claim 6 in which the bolt is on a windshield mounting clip which receives the edge of the windshield, and the bolt extends through the fairing and the extender tab.

8. The fairing extender of claim 1 in which the securing means includes a spring clip affixed to the extender and engaging the edge of the fairing.

9. The fairing extender of claim 1 in which said panel has a wall extending inwardly at the inner edge, generally at right angles to the panel surface to mate with the lateral edge of the fairing; and the securing means includes a spring clip secured to said wall and engaging the edge of the fairing.

10. An extender for a motorcycle fairing, the fairing having a body which extends laterally of the motorcycle, said extender comprising:
- a panel having an edge to mate with the lateral edge of the fairing; and
- means readily removably securing the extender to the fairing, including a tab at the upper end of the extender to mate with an inner surface of the fairing, a bolt and nut securing the tab to the fairing and a spring clip at the lower end of the extender receiving the lateral edge of the fairing.

11. An extender for a motorcycle fairing, the fairing having a body which extends laterally of the motorcycle, said extender comprising:
- a panel with a surface which is an extension of the fairing surface;
- a wall extending inwardly generally at right angles to the panel surface to mate with the lateral edge of the fairing;
- a flange extending from said wall to underlie the fairing along said lateral edge; and
- means for securing said extender to said fairing.

* * * * *